Figure 1:
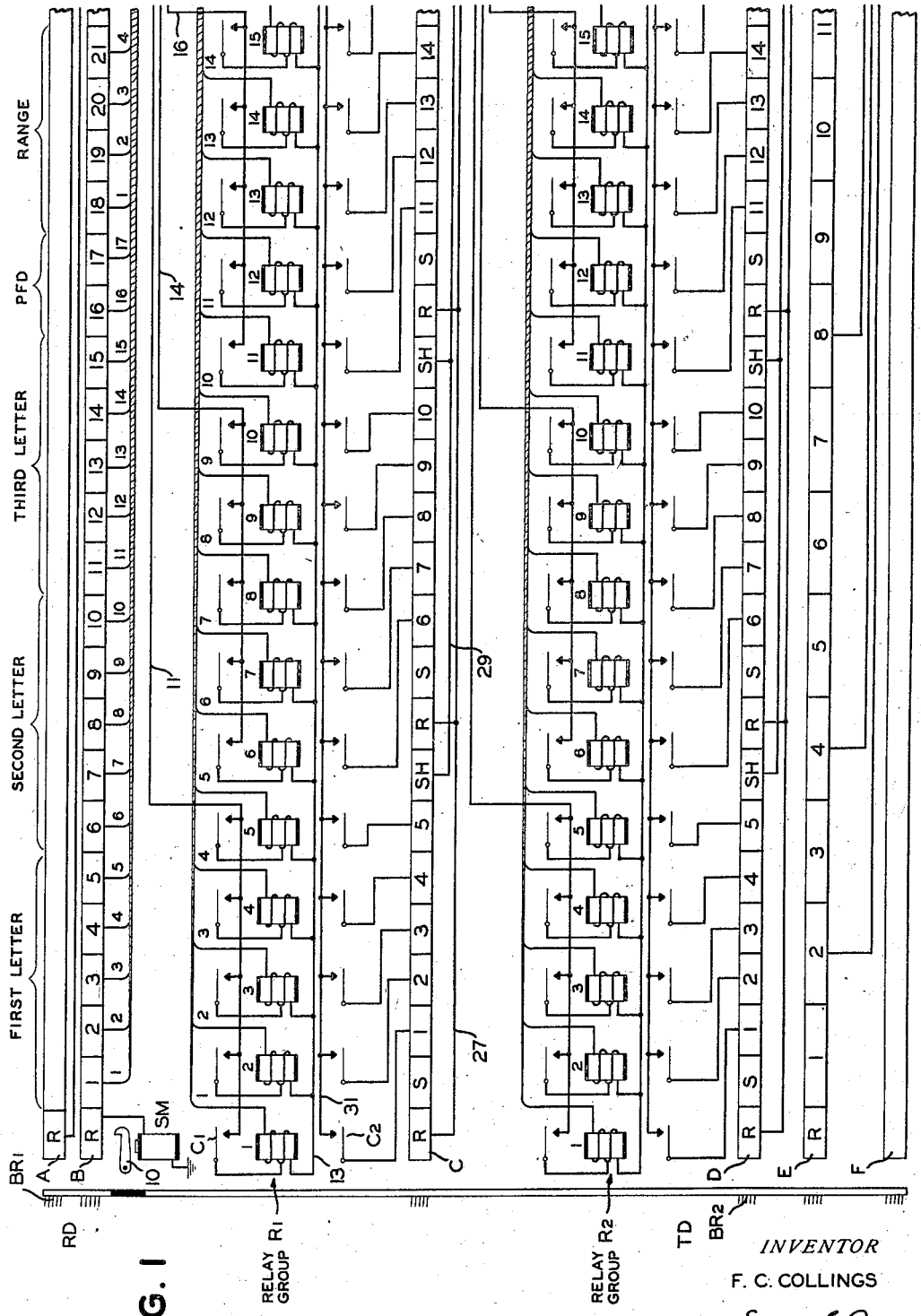

Jan. 16, 1934.　　　　F. C. COLLINGS　　　　1,943,654
MONITOR PRINTER SYSTEM FOR QUOTATION BOARDS
Filed May 26, 1932　　　2 Sheets-Sheet 1

INVENTOR
F. C. COLLINGS
ATTORNEY

Jan. 16, 1934.    F. C. COLLINGS    1,943,654
MONITOR PRINTER SYSTEM FOR QUOTATION BOARDS
Filed May 26, 1932    2 Sheets-Sheet 2

INVENTOR
F. C. COLLINGS
Eugene C. Brown
ATTORNEY

Patented Jan. 16, 1934

1,943,654

UNITED STATES PATENT OFFICE 1,943,654

MONITOR PRINTER SYSTEM FOR QUOTATION BOARDS

Frederick C. Collings, Plainfield, N. J., assignor to The Western Union Telegraph Company, New York, N. Y., a corporation of New York Application May 26, 1932. Serial No. 613,761

27 Claims. (Cl. 178—52)

This invention relates to a telegraph repeating system and is shown with particular reference to the repeating of telegraph signals for the operating of monitor printers used in connection with a quotation board system, for producing a printed record of the information transmitted to the quotation board operating mechanism.

More generally this system is applicable for use in receiving either a start-stop code or multiplex code series of signals and converting them into signals suitable for operating the well known five or six unit start-stop printers, inserting automatically the start and stop impulses for retransmission to the start-stop printers.

The signals employed in single wire transmission for quotation board operation comprise a number of groups of permutation code impulses sent in continuous succession and representing the selection and price quotation of each stock. The selection may be according to a numerical designation or according to an alphabetical designation. In a numerical designation each digit of the stock number may be represented by a signal composed of four impulses arranged in different permutations and in the alphabetical designation by a signal composed of five permutation impulses. The preferred designating signal requires two impulses; the range, that is whether the quotation is a high, low, last, open or closing value, by four impulses; the tens and units values of the stock by four impulses each and the fractions values by three impulses. These impulses as stated follow each other in continuous succession and therefore are not suitable for the operation of the ordinary start-stop telegraph printer.

It is one of the objects of my invention to revise and adapt such signals, by the separation thereof into groups and the addition of certain printer controlling impulses such as start, rest and shift impulses, so as to render them capable of operating a standard start-stop printer.

Another object is to divide up such a continuous series of impulses into individual groups and to distribute said groups in timed relation to a recording mechanism.

A further object is to distribute successive series of such continuous impulses to predetermined ones of a plurality of recorders or to distribute predetermined series of impulses to a single recorder.

Other objects and advantages of the invention will hereinafter appear.

Figure 2:
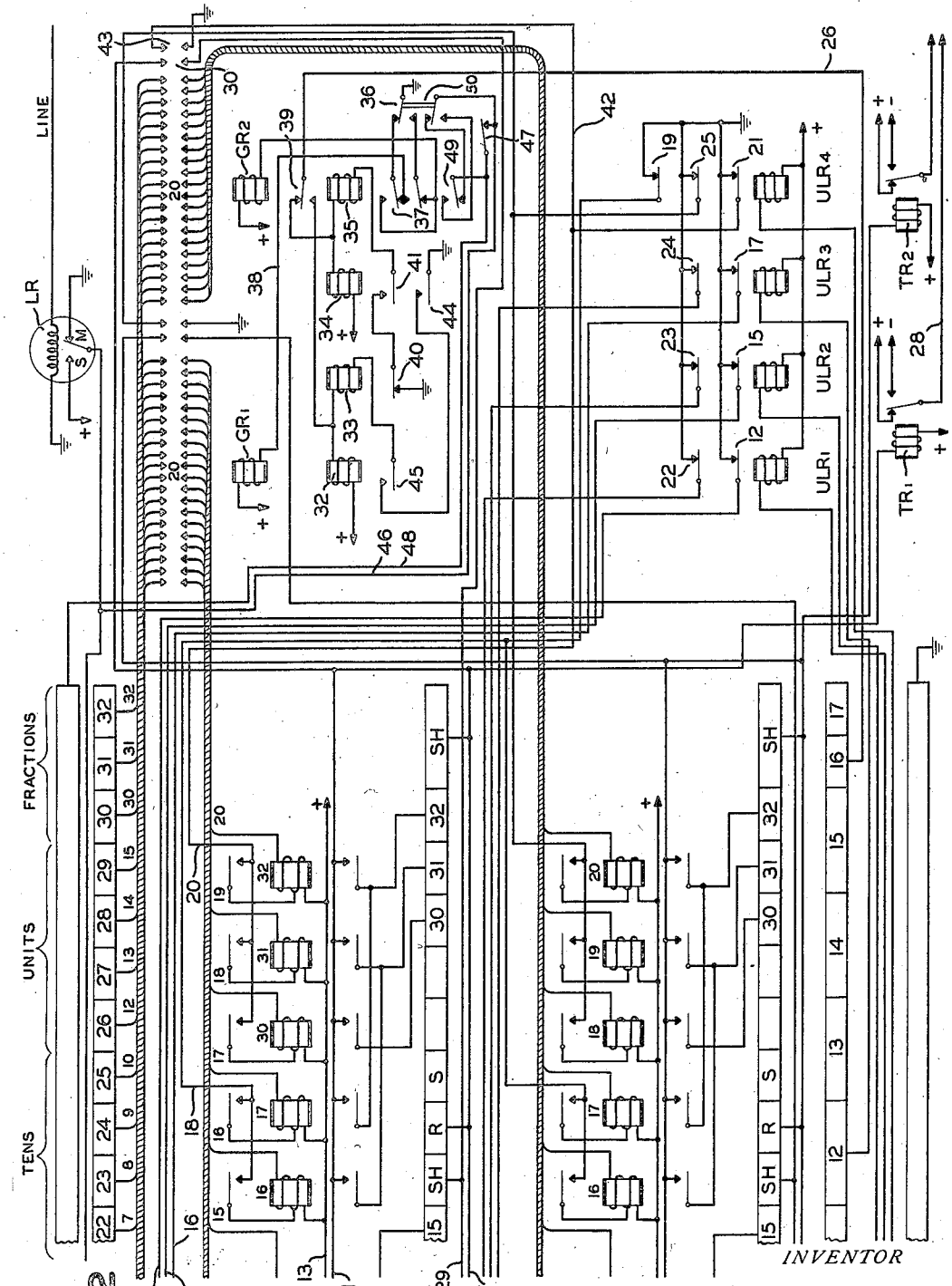

The invention will be best understood by reference to the accompanying drawings in which:

Figures 1 and 2 show a receiving and transmitting distributor together with the necessary storage, locking and transfer relays utilized in one embodiment of the invention.

In the modification shown, the stocks, the quotations of which are to be posted, are represented by three letter alphabetical designations, which together with the preferred, range and price indications, require a total of thirty-two successive signal impulses transmitted during one revolution of the transmitting and receiving distributors. Each of such series of stock selecting and posting signals is followed by a rest period to permit the distributors to be maintained in synchronism. The signal impulses are received over a telegraph line and repeated by a polar line relay LR to the solid receiving ring A of the face plate of a receiving distributor RD. Marking signals cause ground to be applied to the ring A and spacing signals cause positive battery to be applied through the contacts of the line relay LR. The receiving face plate also has a segmented ring B, having a rest segment R and thirty-two active segments consecutively numbered. The receiving brush BR1 is normally held at rest on segment R by a latch 10, controlled by a start magnet SM, one terminal of which is grounded and the other of which is joined to the segment R of ring B.

The segments 1 to 32 are connected through the contacts of a gang relay GR1 to the windings of a group of storage relays R1. Each relay of group R1 is provided with a locking contact C1 and a signal storage contact C2. Segments 1 to 5 of ring B, corresponding to the first letter of the alphabetical stock designation, are connected to one terminal of the windings of relays numbered 1 to 5, locking ground for these relays being applied through the locking contact C1 and a common conductor 11 to the lower contact 12 of unlocking relay ULR1. Operating and holding battery is supplied to all of the relays of group R1, through a conductor 13.

Segments 6 to 10 of ring B representing the second letter of the stock designation, are similarly connected to the windings of the correspondingly numbered relays, the locking ground being applied through conductor 14 and contact 15 of unlocking relay ULR2. Segments 11 to 15 representing the third letter of the stock designation are also connected to the windings of the correspondingly numbered relays, the locking ground being applied through a conductor 16 and contact 17 of unlocking relay ULR3. Segments 16 and 17, corresponding to the preferred designation of the stock, are connected to the relays numbered 16 and 17, locking ground for these relays being provided through conductor 18 and contact 19 of unlocking relay ULR4. Segments 18 to 21 representing the range, are connected in common with segments 1 to 4 to relays 1 to 4. Segments 22 to 25, corresponding to the tens value of the stock are connected, in common with segments 7 to 10, to relays numbered 7 to 10, and segments 26 to 29, corresponding to the units value of the stock, are connected, in common with the segments 12 to 15, to the relays numbered 12 to 15. The fractions segments 30 to 32 are connected to the fractions storage relays 30 to 32, ground for these relays being applied through conductor 20 and contact 21 of unlocking relay ULR4.

Each of the segments 1 to 32 are similarly connected through a second gang relay GR2 to the relays of group R2, locking ground for which is similarly applied through the contacts 22, 23, 24, 19 and 25 of unlocking relays ULR1 to ULR4.

The repeating distributor face plate TD has four rings designated C, D, E and F. Ring F is solid and serves to apply ground to the other rings through the brushes BR2. Ring E is a local ring, segments 2, 4, 8 and 12 of which are connected through windings of the unlocking relays ULR4, ULR1, ULR2 and ULR3 respectively. Segment 16 of ring E supplies ground, through a conductor 26, for effecting the transfer of the incoming signals from one group of storage relays R1 and R2 to the other, as will subsequently appear.

The transmitting ring C, provided for relay group R1, is provided with four groups of eight segments each comprising a rest segment R, start segment S, five code segments, numbered to correspond to the relays associated therewith, and a shift segment SH. All of the rest segments R and the last shift segment SH are to be connected by a conductor 27 to the winding of transmitting relay TR1, by which the regenerated and revised signals are repeated to the first channel printer over conductor 28. The remaining shift segments SH are connected to the winding of transmitting relay TR1 through a conductor 29 and contacts 30 of gang relay GR2. The code segments 1 to 5 of the first group are connected to the lower of signal storage contacts C2 of relays numbered 1 to 5 of group R1. Code segments numbered 6 to 10 of the second group are connected to the contacts C2 of the correspondingly numbered relays as also are segments 11 to 15 of the third group. Segments 30, 31 and 32 are connected to the contacts of C2 of relays 30, 31 and 32, segments 31 and 32 being additionally connected to the contacts of relays 16 and 17. All of the contacts C2 are connected through the conductor 31 to the transmitting relay TR1.

The segments of repeating ring D are similarly related to the contacts of relays R2 and to the transmitting relay TR2 of the second channel printer, the rest segments R and the last shift segment SH being connected to the transmitting relay TR2 through contact 31 of a gang relay GR1.

The operation of the system is as follows. Assuming the gang relay GR1 to be closed, storage relays R1 and R2 to be unoperated, brushes BR1 and BR2 at rest and steady marking battery on the line L holding the contact tongue of line relay LR on its grounded contact. The first impulse of each series of signals is a spacing or starting impulse which moves the line relay to its left or spacing contact, thereby applying battery via conductor 45, through rest segment R of ring A, brush BR1 and segment R of ring B to the start magnet SM, thereby releasing brushes BR1 and BR2 for one revolution. As brush BR1 passes over segments 1 to 5 of ring B, the first selecting group is received. Assuming impulses 1, 2 and 5 to be marking and impulses 3 and 4 to be spacing, brush BR1 as it engages segment 1 will complete an operating circuit for relay numbered 1 of group R1, from ground at the marking contact of the line relay LR, conductor 46, switch 47, conductor 48, solid ring A, segment 1, the conductor connected thereto to the winding of the relay numbered 1 and thence to the supply conductor 13. Relay 1 locks up through its contact C1 and contact 12 of unlocking relay ULR1. Similarly relays 2 and 5 are operated and relays 3 and 4 remain unoperated. In the same manner the signals corresponding to the second and third letter of the stock designation are set on the contacts of relays 6 to 15 and the signals corresponding to the preferred designations are set up on contacts of relays 16 and 17.

During this operation of relays 1 to 17, brush BR2 is passing over the segmented repeating ring C and as it moves off of rest segment R on to dead segment S, the circuit of the transmitting relay TR1 is interrupted, thereby transmitting a spacing or starting condition to the first channel printer over conductor 28. As brush BR2 passes on to the first code segment numbered 1 of ring C, the brush BR1 will have passed off of segment 1 of ring B and the first received impulse will be stored in relay numbered 1. A marking impulse is, therefore, repeated to the transmitting relay TR1 from ground on ring F, brush BR2, code segment 1 of ring C, contact C2 of relay 1 and conductor 31 to the transmitting relay TR1. The first code impulse is thus retransmitted to the first channel printer. Similarly the remaining impulses of the code group, representing the first letter of the stock designation, are repeated to the first channel printer an instant after being set up on the storage relays. Since this is an alphabetical designation, it is printed in the normal or letter shift position of the start-stop printer and, therefore, no shift impulse is required. The circuit from the first shift segment SH is, therefore, held open at contact 30 of the gang relay GR2, which is unoperated at this time. As brush BR2 reaches segment 4 of ring E, ground will be applied to the unlocking relay ULR1, opening the same and thereby breaking the locking circuit of relays 1 to 5. Similarly as brush BR2 passes over segments 6 to 10 and 11 to 15 of ring C, separate groups of signals, representing the second and third letter designation and having start and shift conditions added, will be repeated to the first channel printer. The selection set up on relays 6 to 10 is released as brush BR2 passes segment 8 of ring E, operating unlocking relay ULR2 and the selections set up of relays 11 to 15 is released as brush BR2 passes segment 12 of ring E, operating unlocking relay ULR3.

It will be noted, therefore, that at the time the receiving brush BR1 has reached segment 17 of ring B, the first and second letter signals have been retransmitted from ring C and relays 1 to 10 released in readiness to receive new combinations. Consequently relays 1 to 4 may now be used to store the range signals as brush BR1 passes over segments 18 to 21 and relays 7 to 10 may be used to store the tens signals as brush BR1 passes over segments 22 to 25. During the reception of the range signals relays 11 to 15 are released (by passage of brush BR2 over segment 12 or ring E) in time for the units signals to be set up on relays 12 to 15, this occurring as brush BR1 passes over segments 26 to 29. The fractions signals are set up on individual fraction relays 31 and 32 as the receiving brush BR1 completes its revolution. The "preferred" signals set up on relays 16 and 17 are repeated with the missing impulses filled in as brush BR2 passes segments 31 and 32. These segments, it will be noted, are located in advance of the segments 31 and 32 of ring B and consequently fractions relays 31 and 32 have not been operated at this time. Since the "preferred" symbols consist of the numbers 1, 2 or 3, representing first, second and third preferred, they must be printed in the numbers shift position of the start-stop printer, thereby requiring a marking shift impulse following the code impulses. For this purpose the last shift segment SH supplies a marking impulse from the grounded ring F directly over the conductor 27 to the transmitting relay TR1.

At the end of the first revolution it will be noted that the signals representing the first, second and third letters of the stock abbreviation and the "preferred" designation have been received and repeated to the first channel start-stop printer and the signals representing the range, tens, units and fractions values of the stock have been received and stored in the relays of group R1.

The passage of brush BR2 over segment 16 of ring E applied ground to conductor 26 to initiate the operation of a group of transfer relays 32 to 35. In the condition assumed with gang relay GR1 operated all of the transfer relays 32 to 35 were deenergized, relay GR1 being operated from ground at the manual switch 36, back contact of tongue 37 of relay 35 and conductor 38. The ground applied to the conductor 26 through segment 16 of ring E is applied through the back contact of tongue 39 of relay 35, to the winding of relay 34. This relay 34, upon picking up, applies ground to relay 35 from the back contact 40 of relay 33 and front contact 41 of relay 34. Relay 35 does not operate, however, until the brush BR2 passes off of segment 17 thereby removing the ground from the opposite terminal of the winding of relay 35. Relay 35 upon operation transfers the conductor 26 to the winding of relay 32 and applies the ground from the switch 36 through the front contact of tongue 37 of relay 35 to the gang relay GR2 operating the same and interrupting the circuit of gang relay GR1. Consequently the next series of stock selecting and posting signals are repeated from the segments of ring B to the storage relays of group R2 and are repeated by ring D to transmitting relay TR2 for operation of the second channel printer.

During the second revolution of the receiving and repeating brushes BR1 and BR2 the range, tens, units and fractions signals stored in relay group R1 are transmitted through the relay TR1 to the first channel printer. Since all of these signals represent numbers of symbols appearing in the numeral shift position of the printer it is necessary to add a marking shift impulse to each group. These impulses are supplied as each shift segment SH is passed, through the conductor 29 and contact 30 of the gang relay GR2, which is closed at this time.

During the first part of the second revolution of the distributor brushes the relays 16 and 17 were unlocked by unlocking relay ULR4 as the brush BR2 passed over segment 2 of ring E.

In order to prevent unlocking of the fractions relays 30, 31 and 32 upon which the fractions selection is set up at this time, a second locking ground for these relays is supplied independently of contact 21 of unlocking relay ULR4. This second ground is completed at this time through conductor 42 and auxiliary contact 43 of gang relay GR2.

As the distributor nears the end of its revolution the transfer relays 32 to 35 are again operated to reverse the positions of gang relays GR1 and GR2. At this point in the cycle of operation it will be recalled that transfer relays 34 and 35 were locked up over the back contact 40 of relay 33. As the brush BR2 again engages segments 16 of ring E ground is applied from the conductor 26 through front contact of tongue 39 of relay 35, to the winding of relay 32. This relay upon operating applies ground to relay 33 from the front contact 44 of relay 34 and front contact 45 of relay 32. As brush BR2 passes off of segment 16 relay 33 operates breaking the locking ground of relays 34 and 35 thereby releasing these relays. The release of relay 34 in turn interrupts the ground to relays 32 and 33. Thus all of the relays 32 to 35 are deenergized transferring conductor 26 back in circuit with the winding of relay 34, connecting ground at the manual switch 36 to the gang relay GR1 and removing the same from relay GR2.

It will be evident from the foregoing that each series of stock selecting and posting signals received are repeated alternately to the first and second channel printers, the selecting and preferred signals being repeated during the same revolution of brushes BR1 and BR2 in which they are received and the range, tens, units and fractions signals being repeated during the succeeding revolution.

It is obvious, of course, that the magnets TR1 and TR2, in place of repeating the signals to start-stop printers, may be the printer magnets themselves and where the record is desired for monitoring purposes, only a single printer need be employed on which every alternate selecting and posting signal group is received.

For this purpose relay 35 has been provided with an additional tongue 49 and the manual switch 36, with an extra tongue 50. When it is desired to receive on a single printer only switch 47 is opened. With switch 36 in the upper position shown, only the printer controlled through relay group R1 will be operated. When relay 35 is deenergized it will be recalled that gang relay GR1 is closed and signals received over the line are repeated to relay group R1. The circuit from the tongue of line relay LR is completed at this time, through conductor 46, lower tongue 50 of switch 36 and its upper contact, to the lower contact and tongue 49 of relay 35 and thence by conductor 48 to the solid ring A of the receiving face plate. Signals received during this time are thus repeated to storage relays of group R1, and transmitted to the printer controlled by transmitting relay TR1. During the next revolution of the distributor, relay 35 is held energized and gang relay GR2 is closed as previously described. The circuit from the tongue of line relay LR to ring A is interrupted at this time however, at the tongue of contact 49 of relay 35. Consequently signals received over the line are not recorded. It will be noted therefore that alternate signal groups only are recorded. By reversing the position of switch 36, the opposite alternate groups will be recorded upon the same printer.

If the record is desired only for monitoring purposes obviously only the one printer is required. In this case relay group R2 and repeating ring D may be omitted and in place of the gang relays GR1 and GR2 segments 1 to 32 of ring B may be connected directly to the storage relays of group R1. The transfer relay 35 in this case would interrupt the output circuit of line relay LR during the reception of every alternate series of signals as just described.

While I have described the invention with particular reference to a stock quotation monitoring system, it is to be understood that it is not limited to such use. For instance, it is particularly applicable to a system employing ordinary multiplex equipment for transmitting in continuous succession, a number of selecting conditions for a plurality of characters of a single message without intermediate start and stop impulses, these impulses being filled in by the retransmitting rings. In such case, a definite number of characters of one message might be received during one revolution and repeated to one start-stop printer during this and the subsequent revolution and a corresponding number of characters of a second message received during the next revolution and retransmitted to a second printer.

Obviously various changes and modifications may be made in the system described without departing from the invention and, therefore, I do not desire to be limited to the specific details shown but it is to be understood that the invention contemplates all variations coming within the scope of the appended claims.

What I claim is:

1. In a signaling system, a source of signals comprising a plurality of groups of character code signals consisting solely of selecting impulses transmitted in continuous succession and forming part of a single message, and means responsive to said signals and arranged to insert rest and start impulses intermediate each character code group.

2. In a signaling system, a source of signals comprising a plurality of groups of character code signals transmitted in continuous succession and forming a part of a single message, a receiving distributor and means including said distributor for applying printer control conditions to each character code group.

3. In a signaling system, a source of signals comprising a plurality of groups of character code signals transmitted in continuous succession and forming a part of a single message, a receiving distributor and means including said distributor for inserting a case shift condition in each character code group.

4. In a signaling system, a source of signals comprising a plurality of groups of character code signals transmitted in continuous succession, a receiving distributor arranged to receive said signals during a predetermined time interval, and means associated with said distributor for retransmitting said plurality of groups of signals over a substantially longer time interval.

5. In a signaling system, a source of signals comprising a plurality of groups of character code signals transmitted in continuous succession, a receiving distributor arranged to receive said signals during a predetermined time interval, and means associated with said distributor for applying additional signal conditions to said received signals and retransmitting said plurality of groups of signals over a substantially longer time interval.

6. In a signaling system, a source of signals comprising a plurality of groups of character code signals transmitted in continuous succession, a receiving distributor arranged to receive said signals at a predetermined impulse frequency, and means associated with said distributor for applying additional signal impulses to each character code group and for repeating said signals at substantially the same impulse frequency.

7. In a signaling system, a source of signals comprising a plurality of groups of character code signals transmitted in continuous succession, a receiving distributor arranged to receive said signals during a predetermined time interval, means associated with said distributor for retransmitting said signals over one channel during a substantially longer time interval and means for receiving signals on said receiving distributor, corresponding to another message, during the difference in said time intervals, for retransmission over another channel.

8. In a signaling system, a source of signals comprising a plurality of groups of character code signals transmitted in continuous succession, a receiving distributor arranged to receive said signals during a predetermined time interval, a plurality of storage elements for said signals less in number than the number of impulses transmitted in such continuous succession, and means for repeating said signals from said storage elements over a substantially longer time interval.

9. In a signaling system, a source of signals comprising a plurality of groups of character code signals transmitted in continuous succession, a receiving distributor arranged to receive said signals at a predetermined impulse frequency, a plurality of storage elements for said signals, less in number than the number of impulses transmitted in such continuous succession, and means for applying additional signal conditions to said received signals and repeating said signals from said storage elements at substantially the same impulse frequency.

10. In a signaling system, a source of signals, a distributor arranged to receive a plurality of groups of character code signals during one cycle of operation thereof, and means associated with the distributor for retransmitting said groups of character code signals during two cycles of operation of the distributor.

11. In a signaling system, a source of signals, a distributor having a receiving ring arranged to receive a predetermined number of groups of character code signals during one cycle of operation thereof, a transmitting ring and signal storage devices associated with the distributor and arranged to retransmit said groups of character code signals during two cycles of operation of the distributor, and means for inserting additional impulses in each group of retransmitted signals.

12. In a signaling system, a source of signals, a distributor having a receiving ring and a transmitting ring, a plurality of storage relays for storing the impulses as received and repeating a portion of said signals through the transmitting ring during the receiving cycle and a further portion thereof during a subsequent cycle of the distributor.

13. In a signaling system, a source of signals, a distributor having a receiving ring and a plurality of transmitting rings, a set of storage relays for each transmitting ring for storing the impulses as received, one set of relays and its associated transmitting ring serving to repeat a portion of said signals during the cycle in which the signals are received and a further portion during a subsequent cycle, and the other set of relays and transmitting ring serving to store and repeat the signals received during said subsequent cycle.

14. In a signaling system, a source of signals, a distributor having receiving segments corresponding to a plurality of groups of character code signals, two sets of storage elements associated with said distributor, means for applying signals received on said receiving segments alternately to said sets of storage elements during successive cycles of operation of the distributor and retransmitting means associated with each set of storage elements.

15. In a signaling system, a source of signals, a distributor having receiving segments corresponding to a plurality of character code groups of signals, two sets of storage elements associated with said distributor, means for applying signals received on said receiving segments alternately to said sets of storage elements during successive cycles of operation of the distributor, and separate retransmitting means associated with each set of storage elements arranged to retransmit said signals.

16. In a signaling system, a source of signals, a distributor having receiving segments corresponding to a plurality of character code groups of signals, two sets of storage elements associated with said distributor, means for applying signals received on said receiving segments alternately to said sets of storage elements during successive cycles of operation of the distributor, and separate retransmitting means associated with each set of storage elements arranged to insert printer control conditions in each character code group of signals and to retransmit said signals over a period in excess of the period of reception thereof.

17. In a signaling system, a source of signals, a distributor having receiving elements, a plurality of sets of storage elements associated with said distributor, and transfer relays controlled by said distributor for applying signals received on said receiving elements to said sets of storage relays in succession during succesive revolutions of the distributor.

18. In a signaling system, a source of signals, a distributor having receiving elements, a plurality of sets of storage elements associated with said distributor arranged to store a plurality of successive characters, and transfer relays controlled by said distributor for applying signals received on said receiving elements with said sets of storage relays in succession during successive revolutions of the distributor.

19. In a signaling system, a source of signals comprising a plurality of groups of character code signals, said groups consisting of a non-uniform number of selecting conditions, a distributor arranged to receive said signals, retransmitting means associated with said distributor and means for adding selecting conditions to said character code groups to render the number of selecting conditions in each group uniform.

20. In an apparatus of the character described, the combination of a one wire permutation code receiving distributor, storage relays adapted to be energized over said distributor for storing information as to one item upon each operation of the distributor, means for holding said relays energized, a pair of retransmitting mechanisms included in said receiving distributor, a pair of monitor printers, circuits adapted to be made across one of said pairs of retransmitting mechanisms for operating one of said printers to print information stored in certain of said storage relays, and circuits adapted to be made across the other of said retransmitting mechanisms for controlling the other of said printers to print information stored in other of said storage relays, the operation being such that complete information as to each item is printed by one or the other printer during two operations of said receiving distributor.

21. In an apparatus of the character described, the combination of a receiving distributor, a set of storage devices for storing pulses received over said distributor, a pair of retransmitting devices, a pair of printers, circuits adapted to be made across one of said retransmitting devices for operating one of said printers to print information stored in certain of said storage devices, and circuits adapted to be made across the other of said retransmitting mechanisms for controlling the other of said printers to print information stored in the other of said storage devices.

22. In an apparatus of the character described, the combination of a receiving distributor including a segmented distributor ring, sets of storage relays adapted to be connected to said segments to be operated by pulses over said segments, a pair of segmented distributor rings included in said receiving distributor, a pair of recording devices, and means for separately operating said recording devices simultaneously over said distributor rings under the control of contacts of different ones of said storage relays.

23. In apparatus of the character described, the combination of a receiving distributor including a segmented distributor ring, storage relays adapted to be connected to said segments to be operated by pulses over said segments, a pair of segmented distributor rings included in said receiving distributor, a pair of recorders and circuits adapted to be made over contacts of said storage relays and segments of said distributor rings to said recorders to record information stored in certain of said relays on one recorder and information stored in the remaining of said storage relays on the other of said recorders, and channeling mechanism operable to cause all of the information relating to one item to be recorded by one recorder and that of the succeeding item by the other recorder.

24. In an apparatus of the character described, the combination of a receiving distributor including a segmented distributor ring, storage relays adapted to be connected to said segments to be operated by pulses over said segments, a pair of segmented distributor rings included in said receiving distributor, a pair of recorders and circuits adapted to be made over contacts of said storage devices and segments of said distributor rings to said recorders to record information stored in certain of said relays on one of said recorders and information stored in the remaining of said storage relays on the other of said recorders, channeling mechanism operable to cause all of the information relating to one item to be recorded by one recorder and that of the succeeding item by the other recorder, and means included in said channeling mechanism for causing the first item of a series of items received to be recorded by a particular one of said recorders.

25. In an apparatus of the character described, the combination of a one wire permutation code receiving distributor, storage relays adapted to be energized over said distributor for storing information as to an item upon each operation of the distributor, means for holding said relays energized, a pair of retransmitting mechanisms included in said receiving distributor, a pair of monitor printers, circuits adapted to be made across one of said pairs of retransmitting mechanisms for operating one of said printers to print information stored in certain of said storage relays, circuits adapted to be made across the other of said retransmitting mechanisms for controlling the other of said retransmitting mechanisms for controlling the other of said printers to print information stored in other of said storage relays, the operation being such that complete information as to each item is printed by one or the other printer during two successive operations of said receiving distributor, and means controlled by said receiving distributor for opening said holding circuits for said storage relays after transmission across their contacts has been completed.

26. The combination of a receiving distributor, including a segmented face plate, a set of storage relays adapted to be connected to the segments of said face plate, means for energizing said relays over said segments, a pair of retransmitting distributor segmented face plates included in said receiving distributor, wires connecting contacts of certain of said storage relays to the segments of one of said pair of face plates, wires connecting contacts of certain of said storage relays to the segments of one of said pair of face plates, wires connecting contacts of the others of said storage relays to the segments of the other of said pair of face plates, a grounded solid face plate, and a brush for connecting said solid face plate to the segments of said pairs of face plates to apply ground to circuits made across the contacts of said storage relays, a pair of monitor printers, and lines extending from the contacts of said storage relays to said monitor printers.

27. The combination of a receiving distributor including a segmented face plate, storage relays adapted to be connected to the segments of said face plate, means for energizing said relays over said segments, a pair of transmitting distributor segmented face plates included in said receiving distributor, wires connecting contacts of certain of said storage relays to the segments of one of said pair of face plates, wires connecting contacts of the other of said storage relays to the segments of the other of said pair of face plates, a grounded solid face plate, a brush for connecting said solid face plate to the segments of said pairs of face plates to apply ground to circuits made across the contacts of said storage relays, a pair of monitor printers, lines extending from the contacts of said storage relays to said monitor printers, channeling mechanism for normally connecting the lines from the contacts of certain of said storage relays to one printer and the lines from the contacts of the other storage relays to the other printer, and means included in said channeling mechanism for causing the lines from the contacts of the first of said storage relays to be connected to said other printer and the line from the contacts of the second storage relays to said first printer during the next operation of the receiving distributor.

FREDERICK C. COLLINGS.

DISCLAIMER 1,943,654.—*Frederick C. Collings*, Plainfield, N. J. MONITOR PRINTER SYSTEM FOR QUOTATION BOARD. Patent dated January 16, 1934. Disclaimer filed November 21, 1935, by the assignee, *The Western Union Telegraph Company*.

Hereby enters this disclaimer to the subject matter constituting the aforesaid claims 1 to 5 inclusive, 7, 10, 14 to 19 inclusive, and 21 of the patent which read as follows:

"1. In a signaling system, a source of signals comprising a plurality of groups of character code signals consisting solely of selecting impulses transmitted in continuous succession and forming part of a single message, and means responsive to said signals and arranged to insert rest and start impulses intermediate each character code group.

"2. In a signaling system, a source of signals comprising a plurality of groups of character code signals transmitted in continuous succession and forming a part of a single message, a receiving distributor and means including said distributor for applying printer control conditions to each character code group.

"3. In a signaling system, a source of signals comprising a plurality of groups of character code signals transmitted in continuous succession and forming a part of a single message, a receiving distributor and means including said distributor for inserting a case shift condition in each character code group.

"4. In a signaling system, a source of signals comprising a plurality of groups of character code signals transmitted in continuous succession, a receiving distributor arranged to receive said signals during a predetermined time interval, and means associated with said distributor for retransmitting said plurality of groups of signals over a substantially longer time interval.

"5. In a signaling system, a source of signals comprising a plurality of groups of character code signals transmitted in continuous succession, a receiving distributor arranged to receive said signals during a predetermined time interval, and means associated with said distributor for applying additional signal conditions to said received signals and retransmitting said plurality of groups of signals over a substantially longer time interval."

"7. In a signaling system, a source of signals comprising a plurality of groups of character code signals transmitted in continuous succession, a receiving distributor arranged to receive said signals during a predetermined time interval, means associated with said distributor for retransmitting said signals over one channel during a substantially longer time interval and means for receiving signals on said receiving distributor, corresponding to another message, during the difference in said time intervals, for retransmission over another channel."

"10. In a signaling system, a source of signals, a distributor arranged to receive a plurality of groups of character code signals during one cycle of operation thereof, and means associated with the distributor for retransmitting said groups of character code signals during two cycles of operation of the distributor."

"14. In a signaling system, a source of signals, a distributor having receiving segments corresponding to a plurality of groups of character code signals, two sets of storage elements associated with said distributor, means for applying signals received on said receiving segments alternately to said sets of storage elements during successive cycles of operation of the distributor and retransmitting means associated with each set of storage elements.

"15. In a signaling system, a source of signals, a distributor having receiving segments corresponding to a plurality of character code groups of signals, two sets of storage elements associated with said distributor, means for applying signals received on said receiving segments alternately to said sets of storage elements during successive cycles of operation of the distributor, and separate retransmitting means associated with each set of storage elements arranged to retransmit said signals.

"16. In a signaling system, a source of signals, a distributor having receiving segments corresponding to a plurality of character code groups of signals, two sets of storage elements associated with said distributor, means for applying signals received on said receiving segments alternately to said sets of storage elements during successive cycles of operation of the distributor, and separate retransmitting means associated with each set of storage elements arranged to insert printer control conditions in each character code group of signals and to retransmit said signals over a period in excess of the period of reception thereof.

"17. In a signaling system, a source of signals, a distributor having receiving elements, a plurality of sets of storage elements associated with said distributor, and transfer relays controlled by said distributor for applying signals received on said receiving elements to said sets of storage relays in succession during successive revolutions of the distributor.

"18. In a signaling system, a source of signals, a distributor having receiving elements, a plurality of sets of storage elements associated with said distributor arranged to store a plurality of successive characters, and transfer relays controlled by said distributor for applying signals received on said receiving elements with said sets of storage relays in succession during successive revolutions of the distributor.

"19. In a signaling system, a source of signals comprising a plurality of groups of character code signals, said groups consisting of a non-uniform number of selecting conditions, a distributor arranged to receive said signals, retransmitting means associated with said distributor and means for adding selecting conditions to said character code groups to render the number of selecting conditions in each group uniform."

"21. In an apparatus of the character described, the combination of a receiving distributor, a set of storage devices for storing pulses received over said distributor, a pair of retransmitting devices, a pair of printers, circuits adapted to be made across one of said retransmitting devices for operating one of said printers to print information stored in certain of said storage devices, and circuits adapted to be made across the other of said retransmitting mechanisms for controlling the other of said printers to print information stored in the other of said storage devices."

[*Official Gazette December 31, 1935.*]